United States Patent [19]

Kamigaki et al.

[11] Patent Number: 4,808,990
[45] Date of Patent: Feb. 28, 1989

[54] LIQUID CRYSTAL DISPLAY ASSEMBLY

[75] Inventors: Koshi Kamigaki; Toshimichi Katsube, both of Yamatokoriyama, Japan

[73] Assignee: Sharp Kabushiki Kaisha, Osaka, Japan

[21] Appl. No.: 669,843

[22] Filed: Nov. 9, 1984

[30] Foreign Application Priority Data

Nov. 11, 1983 [JP] Japan .............................. 58-175296[U]
Nov. 11, 1983 [JP] Japan .............................. 58-175297[U]
Nov. 11, 1983 [JP] Japan .............................. 58-175298[U]
Nov. 11, 1983 [JP] Japan .............................. 58-175299[U]

[51] Int. Cl.⁴ ............................................. G09G 3/00
[52] U.S. Cl. .................................... 340/784; 340/718; 340/815.2
[58] Field of Search .......................... 368/84; 228/136; 340/718, 719, 765, 784, 815.2; 361/398, 400, 408, 412, 413, 415; 357/80; 350/330, 331 R, 332, 333

[56] References Cited

U.S. PATENT DOCUMENTS

| 3,617,980 | 11/1971 | Alkire | 361/408 |
| 3,828,215 | 8/1974 | Bilsback | 361/398 |
| 4,012,117 | 3/1977 | Lozzery | 361/408 |
| 4,076,165 | 2/1978 | Latasiewicz et al. | 228/136 |
| 4,197,586 | 4/1980 | Nidiffer | 361/398 |
| 4,459,640 | 7/1984 | Latasiewicz et al. | 340/719 |
| 4,468,659 | 8/1984 | Ohba et al. | 340/719 |
| 4,514,042 | 4/1985 | Nukii et al. | 350/331 R |
| 4,549,174 | 10/1985 | Funada et al. | 340/784 |

FOREIGN PATENT DOCUMENTS 2070309 9/1981 United Kingdom ................ 340/765
2122013 1/1984 United Kingdom ................ 340/719

OTHER PUBLICATIONS

"Matchbox-Sized TVs Loom Closer Thanks to Innovative Packaging", by Dale Zeskind in Technology News, EDN, Aug. 5, 1980, vol. 25, No. 14.

Primary Examiner—Gerald L. Brigance
Assistant Examiner—Jeffery A. Brier
Attorney, Agent, or Firm—Birch, Stewart, Kolasch & Birch

[57] ABSTRACT

A liquid crystal display unit integrally assembling both the liquid crystal elements and the drive circuit boards that drive the liquid crystal elements. In particular, the liquid crystal display unit has a configuration wherein the liquid crystal cell is connected to the drive circuit board through a flexible printed circuit board, and the drive circuit board and the liquid crystal cell are structured to sandwich a chassis so that all the elements thereof are integrally assembled together therebetween into a single unit by employing an angle that covers the elements from the front surface of the liquid crystal cell.

14 Claims, 5 Drawing Sheets

LIQUID CRYSTAL DISPLAY ASSEMBLY

BACKGROUND OF THE INVENTION

The present invention relates to a liquid crystal display unit which integrally assembles liquid crystal elements and the drive circuit board for driving the liquid crystal elements.

DESCRIPTION OF PRIOR ART

Generally, conventional liquid crystal display units that integrally combine liquid crystal display elements and a drive circuit board have the typical configuration shown in FIG. 1. It incorporates liquid crystal elements between a pair of glass substrates. A liquid crystal cell which is provided with light defection sheets in both the upper and lower surfaces and a drive circuit board 2 that mounts the drive circuit for the liquid crystal cell 1 are electrically connected to each other by a conductive rubber connector 8, while the liquid crystal cell 1 is built in the display unit by using an angle that secures the cell 1 to the drive circuit board 2. However, such a conventional liquid crystal display unit, particularly one containing high-density display elements in a large liquid crystal cell, has often caused a position deviation to occur between electrode terminals of the liquid crystal cell 1 and the drive circuit board 2.

To prevent this, complex systems are usually required for precisely positioning and assembling the device. In addition, such a conventional liquid crystal display unit can be adversely affected by moisture readily causing leakage to take place from the surfaces between the electrode terminals of the liquid crystal cell 1 and the conductive rubber connector 3.

OBJECT AND SUMMARY OF THE INVENTION

The present invention aims at providing such a liquid crystal display unit with an improved configuration so that the time saving needed for the positioning and assembly of liquid crystal display elements and failure-proof electrical connection of these components can be securely achieved during the production process.

The preferred embodiment of the present invention executes the electrical connection between the liquid crystal cell and the drive circuit board through a flexible printed circuit board, thus providing satisfactory connections between these elements even when using a large-size liquid crystal cell. The improved configuration effectively prevents even the slightest leakage of the liquid crystal elements, and at the same time, it provides means for easily assembling the drive circuit board and effectively integrating these components.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 (b) shows the plain view of the liquid crystal display unit shown in FIG. 2 (a);

FIG. 2 (c) shows the perspective external view of the chassis of the liquid crystal display unit shown in FIG. 2 (a)

FIG. 2 (d) shows the perspective external view of the assembled chassis viewed from the rear surface;

DETAILED DESCRIPTION OF THE EMBODIMENTS

Figure 6A:
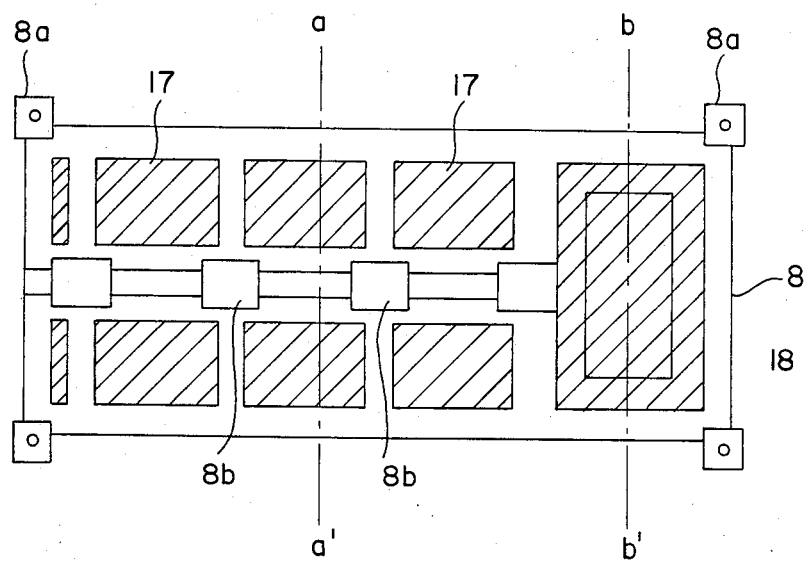
Figure 6B:
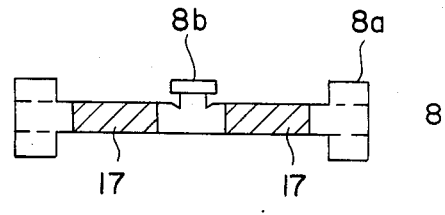
Figure 6C:
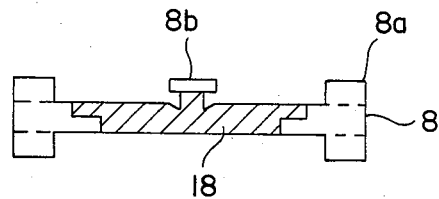

FIG. 6 (a) shows a plan view of the chassis 8;

FIG. 6 (b) shows a sectional view of FIG. 6 (a) taken along line a—a' of FIG. 6 (a); and FIG. 6 (c) shows another sectional view of FIG. 6 (a) taken along line b—b' of FIG. 6 (a).

FIG. 2 (a) shows a lateral view of the assembly process of a liquid crystal display unit according to the preferred embodiment of the present invention. Reference number 5 indicates the liquid crystal cell which is provided with liquid crystal elements between a pair of glass substrates and light deflection sheets in both the upper and lower surfaces of the glass substrates.

Electrode terminals which are provided in the edge portions of the segment substrate of the liquid crystal display cell 5 and the drive circuit board 6 are mutually connected by heat-sealing through the flexible printed circuit board 7 (for example, made of an anisotropic conductive film, a product of Sony Chemical Co., Ltd., Japan). FIG. 2 (a) shows a state in which the flexible printed circuit board 7 is bent, whereas FIG. 2 (b) shows such a state in which the flexible printed circuit board 7 is spread out. When the flexible printed circuit board 7 is bent, the liquid crystal cell 5 and the drive circuit board 6 sandwich the chassis 8 made of plastic material. The perspective external view of the chassis 8 is shown in FIG. 2 (c). The chassis 8 has 4 projections 8a in its four corners, with which the drive circuit board 6 can be precisely set and stably secured in position. FIG. 2 (d) shows the perspective external view (shown from the rear surface) of the liquid crystal display unit having such a configuration in which the flexible printed circuit board 7 is first bent, followed by installation of the drive circuit board 6 onto the chassis 8, and finally the drive circuit board 6 is secured in position using a stationary angle which is inserted from the front surface of the liquid crystal cell 5. In FIG. 2 (d), reference number 9 indicates the stationary angle, while nails 9a are provided at the periphery of the angle. These nails 9a of the stationary angle 9 are bent after being introduced into holes set in the periphery of two pieces of the drive circuit boards 6 and 6 so that these drive circuit boards 6 and 6 can be stably set in position. Reference number 10 and 10 respectively indicate chips made of metal or plastic material, to which the drive circuit boards 6 and 6 are respectively set in position with screws. As a result, both the liquid crystal cell 5 and two pieces of the drive circuit boards 6 and 6 are stably integarted by means of the metal angle and the chassis 8.

Figure 1:
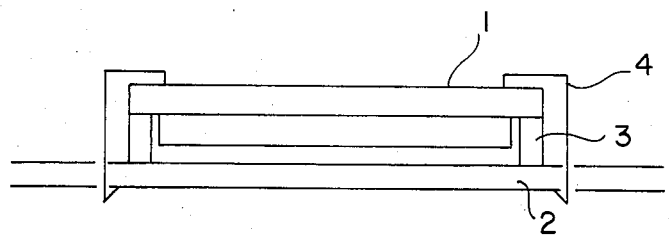
FIG. 1 shows the sectional view of a conventional liquid crystal display unit.
Figure 2A:
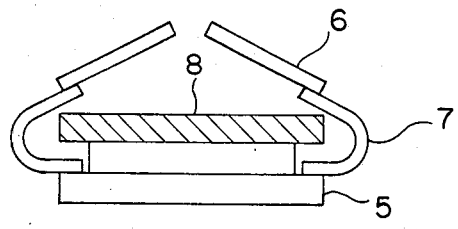
FIG. 2 (a) shows the lateral view that illustrates part of the assembly process of the liquid crystal display unit according to the preferred embodiment of the present invention.
Figure 2B:
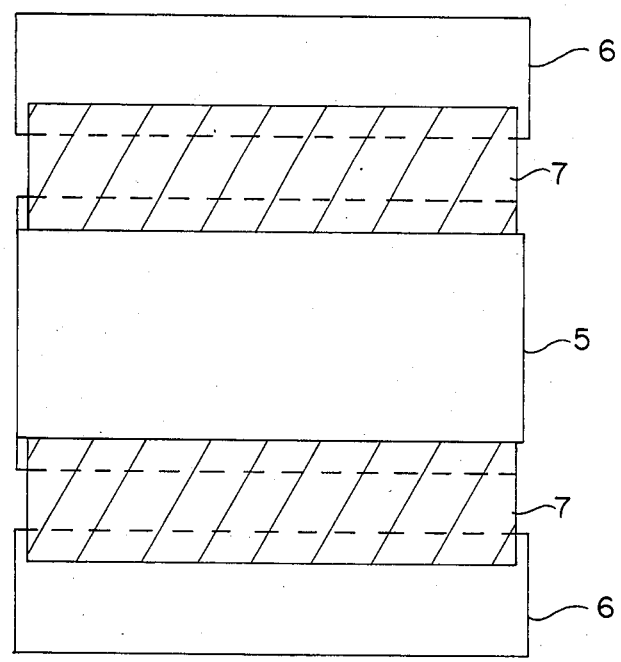
Figure 2C:
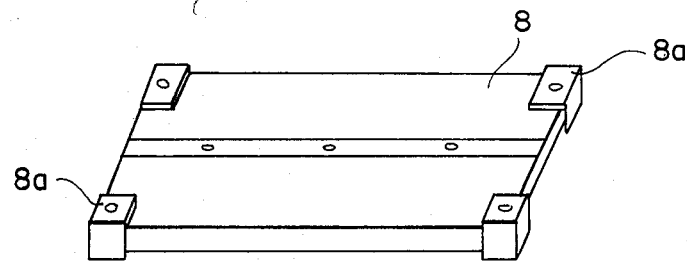
Figure 2D:
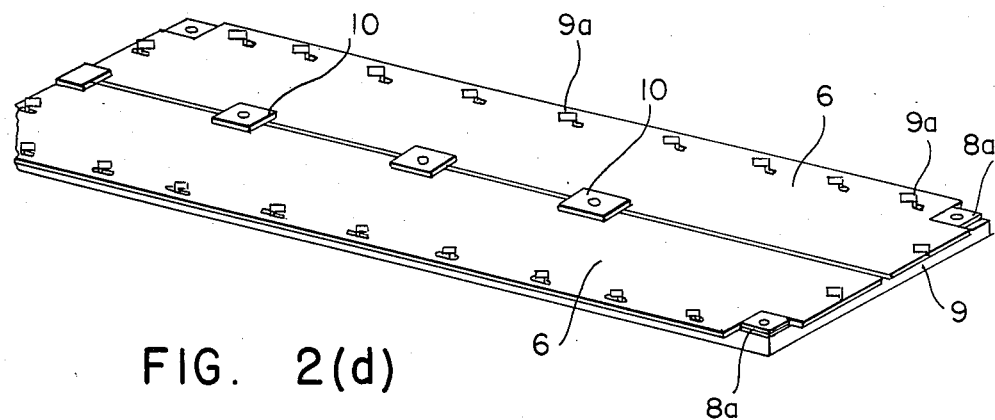
Figure 3:
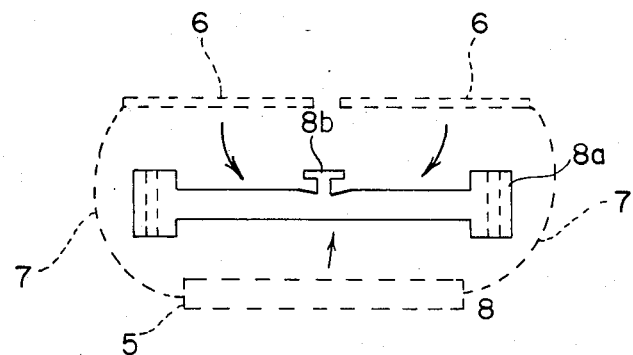
FIG. 3 shows the lateral view of the chassis according to another preferred embodiment of the present invention.

FIG. 3 shows the lateral view of the chassis 8 according to another preferred embodiment of the present invention. There are 4 projections 8a in the four corners of the chassis 8 for correctly positioning and stably securing the drive circuit boards 6 in position. In addition, T-shaped projections 8b are provided in the center position of the chassis 8 to engage the drive circuit boards 6. A taper is provided in the lateral part of the T-shaped projections 8b, facilitating a smoother insertion of the drive circuit boards 6. When assembling the liquid crystal display unit, nails 9a of the stationary angle 9 are first led through holes provided in the periphery of a pair of drive circuit boards 6 and 6. These nails 9a are then bent to allow the drive circuit boards 6 and 6 to be stably installed in position. In addition to this, the drive circuit boards 6 and 6 can also be stably secured in position by the T-shaped projections 8b that are provided in the center of the chassis 8. After completing the assembly of these elements, a connector pin is installed in the center of the chassis 8 for electrically connecting the drive circuit boards 6 and 6 at the position of the stationary angle 9.

Figure 4:
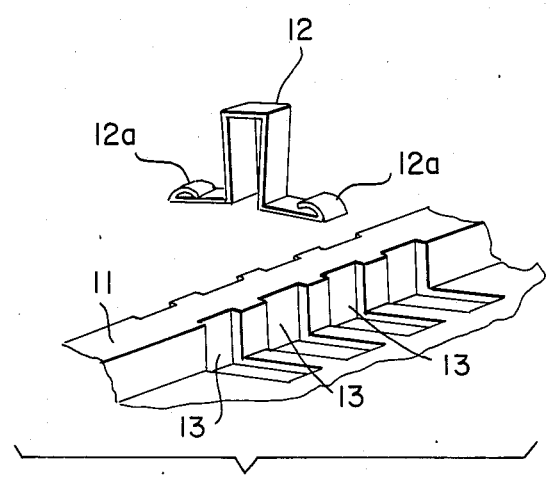
FIG. 4 (a) and (b) respectively show the configuration of the connector pin installation part.
Figure 4B:
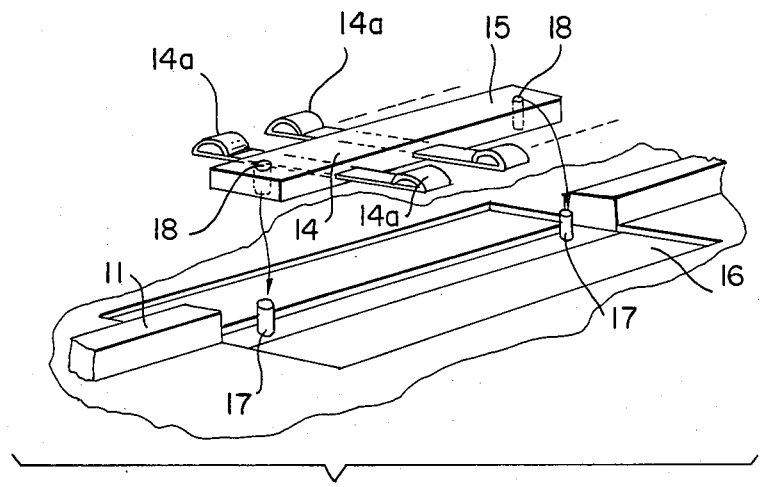

The configuration of the connector pin is described below. FIG. 4 (a) shows the configuration of the location where the connector pin is set. Reference number 11 indicates the linear projection formed in the center of the chassis 8, while grooves 13 are provided so that the connector pin 12 can be secured to a specific position of the linear projection 11. The connector pin 12 is made of high-conductive metal such as plate platinum, while the bent springs 12a are provided on both sides of the connector pin 12. The bent springs 12a cause the electrode terminals 6a and 6a' to be connected to each other at the tip portion of the drive circuit boards 6 and 6'. Each connector pin 12 is set into grooves 13 and 13 provided on the lateral sides of the linear projection 11.

FIG. 4 (b) shows a configuration where the connector pin is set according to another preferred embodiment of the present invention. A specific portion of the linear projection 11 in the center of the chassis 8 is cut out, and a groove 16 is formed in the cutout portion for securing the connector pin 15 containing a plurality of connector arms 14 in place. A pair of the projected pins 17 are provided for engagement with the holes 18 of the connector pin unit 15, thereby stably securing this unit. The connector pin arms 14 are made of a highly conductive metal such as plate platinum, and the bent springs 14a are provided on both sides of the connector pin arms 14. These springs 14a cause the electrode terminals 6a and 6a' to be connected to each other at the tip portion of the drive circuit boards 6 and 6a'.

Figure 5A:
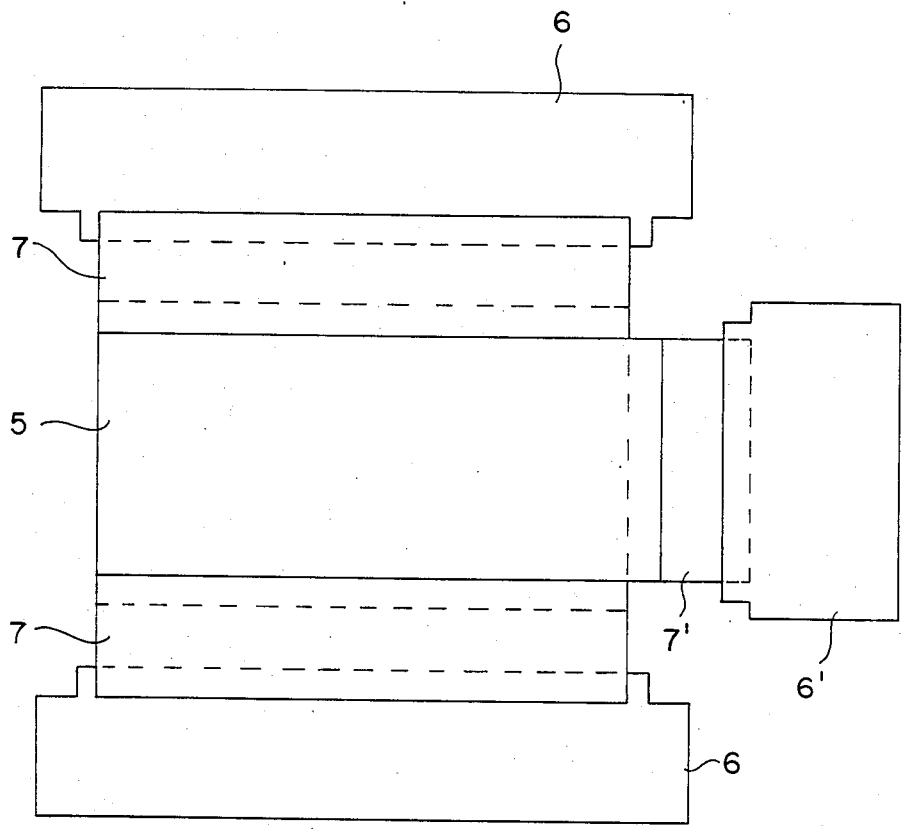
FIG. 5 (a) shows the plain view illustrating part of the assembly process of the liquid crystal display unit according to another preferred embodiment; and FIG. (b) shows the perspective external view illustrating part of the liquid crystal display unit shown in FIG. 5 (a).
Figure 5B:
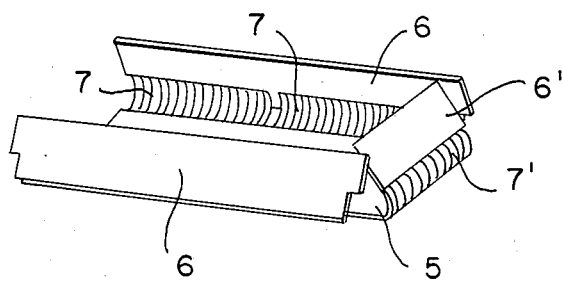

FIG. 5 (a) and (b) respectively show the liquid crystal display unit assembly according to a still further preferred embodiment of the present invention. As shown in FIG. 5 (b), the flexible printed circuit board 7 that connects both the liquid crystal cell 5 and the drive circuit board 6 can be split into a plurality of parts. Likewise, the flexible printed circuit board 7' can also be split into a plurality of parts. The divided configuration of the flexible printed circuit board 7 effectively (1) minimizes possible deviation from the designated positions of the electrode terminals of the liquid crystal cell 5, (2) positions of the conductors of the flexible printed circuit board 7, and (3) the position of the terminal electrodes of the drive circuit board 6, and thus the connection between these elements can be held constant.

It was confirmed by the inventors that about 0.1mm of pitch deviation occurred when the conductor (terminal) of the flexible printed circuit board 7 had 0.2 through 0.8mm of the width, insulator 0.2 through 0.4mm of the width, and when the flexible printed circuit board 7 had 100mm of the width, respectively. Accordingly, in order to securely prevent the position of the terminal electrodes of the liquid crystal cell (or the terminal electrodes of the drive circuit boards) from deviating against the conductor of the flexible printed circuit board 7, the flexible printed circuit board 7 should have a maximum width of 150mm of the width, more preferably, its width should range from 50mm to a maximum of 150mm. It was also proven that the use of any width narrower than that which are suggested above eventually causes the flexible printed circuit board 7 to be split into a greater number of parts, thus resulting in a low operational efficiency when heat-sealing was performed.

The chassis 8 is provided with a plurality of through-holes including first through-holes 17 and 17, and second through-holes 18. The second through hole 18 has the stepwise configuration in its lateral part. The first through-holes 17 and 17 respectively make up the release for LSI, resistors, capacitors, and other components provided for the drive circuit board 6. The second through-hole 18 contains the drive circuit board 6' which is supported by the stepwise configuration of the lateral part of the second through-hole 18. The chassis 8 is made of plastic material, and therefore, the through-holes 17 and 18 can be integrally molded when molding the chassis body. Provision of these through-holes 17 and 18 has eventually made it possible to realize an extremely compact-size and lightweight liquid crystal display unit.

What is claimed is:

1. A liquid crystal display assembly which comprises
a liquid crystal cell,
at least two drive circuit boards, at least two flexible printed circuit boards, each of said of flexible printed circuit boards providing electrical connection between the liquid crystal cell and one end of each of said drive circuit boards, and
a chassis sandwiched between the liquid crystal cell and the drive circuit boards, through the flexible nature of the printed circuit boards, the other end of each of said drive circuit boards being fixed to said chassis.

2. The liquid crystal display assembly according to claim 1, containing a plurality of drive circuit boards, wherein projections are provided on the chassis and the edge portions of the drive circuit board engage with the projections on the chassis.

3. The liquid crystal display assembly according to claim 2 wherein at least one connector pin is disposed on the chassis which causes the plurality of the drive circuit boards to be electrically connected to each other.

4. The liquid crystal display assembly according to claim 2 wherein the chassis is provided with a plurality of through-holes which permit communication between the components of the drive circuit board on one side of the chassis to components on the other side thereof.

5. The liquid crystal display assembly of claim 1 wherein the chassis contains corner projections which are secured to the drive circuit boards.

6. The liquid crystal display assembly of claim 5 wherein a linear projection is formed in the center of the chassis, said linear projection containing grooves, and a connector pin is disposed in each of said grooves for connecting said drive circuit boards.

7. The liquid crystal display assembly of claim 5 wherein a linear projection is formed in the center of the chassis, a portion of the linear projection being cut out and a connector pin containing a plurality of electrical connector arms are disposed in said cut out for connecting with said drive circuit boards.

8. The liquid crystal display assembly of claim 1 wherein at least one stationary single member is provided for securing the drive circuit boards to the liquid crystal cells, with said chassis being disposed therebetween.

9. The liquid crystal display assembly of claim 8 wherein at least one connector pin is installed in the center of the chassis for electrically connecting the drive circuit boards at the position of the stationary angle.

10. The liquid crystal display assembly of claim 1 wherein shaped projections are operatively associated with said chassis for engaging each of said other ends of said drive circuit boards.

11. The crystal display assembly of claim 10 wherein said shaped projections have a T-shaped configuration.

12. The liquid crystal display assembly of claim 11 wherein the shaped projections are disposed at the center of the chassis.

13. The liquid crystal display assembly of claim 1 wherein the shaped projections mechanically and electrically connect the drive circuit boards.

14. The liquid crystal display assembly of claim 1 wherein recessed areas are provided in the chassis for receiving the drive circuit boards.

* * * * *